J. BARSALOUX,
Assignor, by mesne assignments, to N. LYON.
Metallic Stiffener for Boots and Shoes.
No. 9,198. Reissued May 11, 1880.
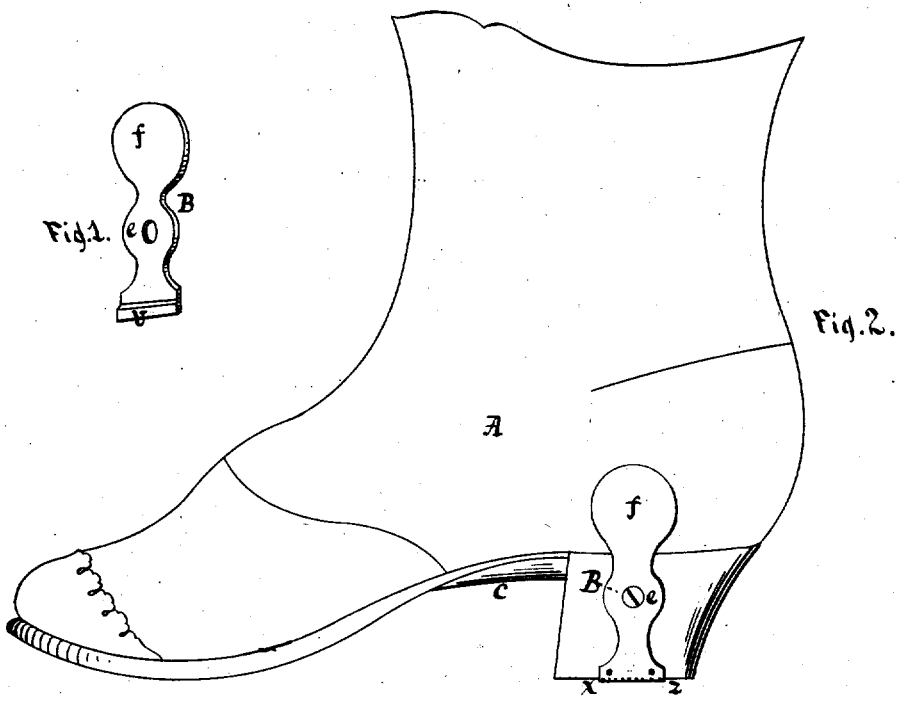
Fig. 1.
Fig. 2.
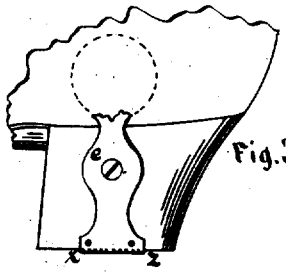
Fig. 3.
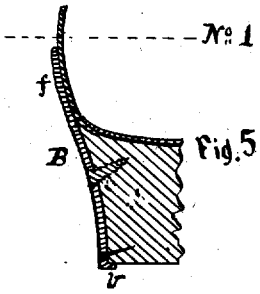
Fig. 5
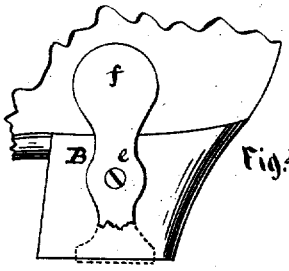
Fig. 4
Witnesses. { Cor. Van Vorhees
Geo. A. Thompson.
Joseph Barsaloux
~~Nelson Lyon~~
~~Per Wm. H. Lyon~~
Jno. Atty. Hay, Attorney
Inventor.
N. PETERS, PHOTO-LITHOGRAPHER, WASHINGTON, D. C.

UNITED STATES PATENT OFFICE.

JOSEPH BARSALOUX, OF SANDY HILL, ASSIGNOR, BY MESNE ASSIGNMENTS, TO NELSON LYON, OF ALBANY, NEW YORK.

METALLIC STIFFENER FOR BOOTS AND SHOES.

SPECIFICATION forming part of Reissued Letters Patent No. 9,198, dated May 11, 1880.

Original No. 128,843, dated July 9, 1872. Application for reissue filed April 8, 1880.

*To all whom it may concern:*

Be it known that I, JOSEPH BARSALOUX, of Sandy Hill, in the county of Washington and State of New York, have invented a certain new and useful Manufacture—viz., a Metallic Stiffener for Boot and Shoe Heels; and I do hereby declare the following to be a full, clear, and exact description thereof, reference being had to the accompanying drawings, and to the letters of reference marked thereon, which form a part of this specification, in which—

Figure 1 represents the stiffener detached. Figs. 2, 3, and 4 represent side elevations of an ordinary shoe with the stiffener attached; and Fig. 5 is a sectional view of the same.

Similar letters of reference in the accompany drawings denote the same parts.

The object of my invention is to prevent the counter of a boot or shoe from falling on one side or breaking; also, to prevent the heel from wearing down more on one side than on the other.

The invention consists of a plate or stiffener constructed and applied in the manner hereinafter shown, to support the counter or prevent the wear of the heel, and thus prevent or remedy the evil of unequal wear and running down of the heels of boots and shoes.

In order to enable others skilled in the art to which the invention appertains to make and use the same, I will now proceed to describe its construction and operation.

In the drawings, A represents an ordinary shoe; B, the plate, which is provided at its center with a hole for the purpose of securing it to the heel of the shoe by means of a screw, as shown at *e*. This plate is provided at its upper end with a head, *f*, which is slightly concave on its inner side, and which fits against the counter of the shoe or boot. The purpose of this is to prevent the counter from bending or breaking, or to restore it to proper position if bent or broken. The lower end of the plate is extended downward to form a part of the bearing-surface of the heel. This part of the plate is represented at V in the figures as extending underneath the heel a short distance, with small pins or rivets *x z* through perforations in the plate, for additional security in the fastening to the heel.

Thus it will be observed that my device will not only prevent the counter from being broken and run down, but it will at the same time prevent the heel from being worn off unevenly.

Having thus fully described my invention, what I claim as new is—

1. A counter or heel support adapted to be attached to the side of the heel and bearing on said side, and also extending upward to bear against the counter, substantially as shown and described.

2. A counter and heel support consisting of a plate having an upward extension to bear against the counter and a downward extension to form part of the bearing of the heel, the plate being secured to the heel, all as set forth.

3. The plate B, constructed with head *f* and flange V, when applied and used in connection with a boot or shoe, substantially as set forth.

JOSEPH BARSALOUX.

Witnesses:

WILLIAM J. HUGGINS,

WILLIAM REMINGTON.